United States Patent
Dimeff

[19]

[11] 3,899,252

[45] Aug. 12, 1975

[54] NDIR GAS ANALYZER BASED ON ABSORPTION MODULATION RATIOS FOR KNOWN AND UNKNOWN SAMPLES

[75] Inventor: John Dimeff, San Jose, Calif.

[73] Assignee: The United States of America as represented by the United States National Aeronautics and Space Administration Office of General Counsel-Code GP, Washington, D.C.

[22] Filed: June 28, 1974

[21] Appl. No.: 484,208

[52] U.S. Cl. .................. 356/51; 250/343; 250/351; 250/373
[51] Int. Cl. .......................................... G01n 21/26
[58] Field of Search ....... 356/51; 250/343, 351, 373

[56] References Cited
UNITED STATES PATENTS

| | | |
|---|---|---|
| 2,806,957 | 9/1957 | McDonald .................... 250/351 X |
| 2,951,938 | 9/1960 | Martin ............................. 356/51 X |
| 3,005,097 | 10/1961 | Hummel ........................ 250/343 X |
| 3,679,899 | 7/1972 | Dimeff .............................. 250/343 |
| 3,728,540 | 4/1973 | Todd et al. ...................... 356/51 X |

Primary Examiner—James W. Lawrence
Assistant Examiner—T. N. Grigsby
Attorney, Agent, or Firm—Darrell G. Brekke; Armand G. Morin, Sr.; John R. Manning

[57] ABSTRACT

A nondispersive gas analyzer is provided with means responsive to the fluctuating intensity of radiation passed through a density modulated known and unknown gas sample for generating a signal containing the frequency modulation of the samples. Included in the signal generating means is means for selectively amplifying those components directly related to the frequency of modulation of the known and unknown samples and means for forming a ratio of said components for generating a signal proportional to the density of the known gas in the unknown gas sample.

15 Claims, 7 Drawing Figures

PATENTED AUG 12 1975 3,899,252

SHEET 1

NDIR GAS ANALYZER BASED ON ABSORPTION MODULATION RATIOS FOR KNOWN AND UNKNOWN SAMPLES

The invention described herein was made by an employee of the United States Government and may be manufactured and used by or for the Government for governmental purposes without the payment of any royalties thereon or therefor.

BACKGROUND OF THE INVENTION

The present invention is directed to nondispersive infrared (NDIR) gas analyzers in general and in particular to an NDIR gas analyzer based on absorption modulation ratios for known and unknown gas samples.

Complex molecules generally have spectra in the infrared which are rich in detail and specific to the molecule. Using these molecular characteristics, various techniques have been developed to measure the infrared spectral absorption or emission characteristics of unknown gases as a means of identifying and quantifying their composition. One such technique is described in terms of several alternative embodiments in U.S. Pat. No. 3,679,899, issued to applicant and assigned to the assignee of the present application.

In the referenced patent, means are disclosed for directing radiant energy sequentially through a reference gas sample and an unknown gas sample. Depending on the embodiment, either the density of each of the samples or the radiant energy path length through each of the samples is modulated at a first and a second frequency, $f_1$ and $f_2$, respectively. A radiant energy detector is provided for detecting the nonabsorbed radiation after it has passed through both samples for providing a complex signal containing a particular signal component which is uniquely related to the absorption caused by the reference gas constituent in the unknown gas sample. A mixer is coupled to the sample modulators for generating a difference signal $(f_1-f_2)$. The difference signal $(f_1-f_2)$ and the complex output of the radiant energy detector is applied to a detector for selecting from the latter signal the particular signal component which corresponds to $(f_1-f_2)$. The selected signal component, which has an amplitude which is directly proportional to the quantity of the reference gas contained in the unknown gas sample, is used to drive a suitably scaled readout means, such as a meter, cathode ray tube recorder, etc.

While describing a means for reducing the limitations on the existing NDIR gas detection devices by providing a means for increasing the specificity based on a technique which could be used with essentially all non-symmetrical molecules of modest size, the apparatus and method described in the patent requires the use of electronic equipment and optical detectors that are more complex than most because the absorption-absorption heterodyning signal on which it is based is inherently small.

SUMMARY OF THE INVENTION

In view of the foregoing, a principal object of the present invention is an NDIR gas analyzing apparatus which extends the above described absorption-absorption technique in a manner that will preserve its advantages while eliminating the disadvantages associated with inherently small signals.

A further object of the invention is an NDIR apparatus which operates on an optical absorption signal itself, as opposed to a small non-linearity of that signal as described in the referenced patent. A still further object of the invention is an NDIR apparatus which uses the principle that the amount of absorption of radiant energy is a gas sample is dependent on the product of the path length of the radiation through that gas sample and the partial density of that gas in the sample.

In accordance with the above objects, there is provided an NDIR gas analyzer comprising a means for propagating radiant energy in sequence through a reference gas sample and an unknown gas sample. The density of the gas samples or the path length of the radiation propagated through the gas samples is modulated by means identical or functionally equivalent to the means disclosed in the above referenced patent. Also, as disclosed in the referenced patent, there is provided in the present invention a detector responsive to the non-absorbed radiation passing through the two gas samples for generating a complex signal containing components related to the modulation of the two samples.

Unlike the patented apparatus, however, there is provided in the present invention a pair of amplifiers coupled in parallel to the output of the radiation detector. One of the amplifiers is provided with means for selectively amplifying that component of the output of the radiation detector which corresponds to the frequency of modulation of one of the gas samples while the second amplifier is provided with means for selectively amplifying that component of the radiation detector which corresponds to the frequency of modulation of the other of the gas samples. Coupled to the output of the amplifiers is a means for forming a product of a signal corresponding to the ratio of the amplitude of the amplifier outputs and a constant dependent on known apparatus parameters and the density of the reference gas. The product signal is applied to a suitably scaled readout means for providing a reading directly proportional to the density of the measured gas in the unknown sample.

DESCRIPTION OF THE DRAWINGS

Other advantages of the present invention will no doubt become apparent to those skilled in the art after having read the following detailed description of the preferred embodiments which are illustrated in the several figures of the drawings.

In the Drawings.

THEORY OF OPERATION

Figure 1:
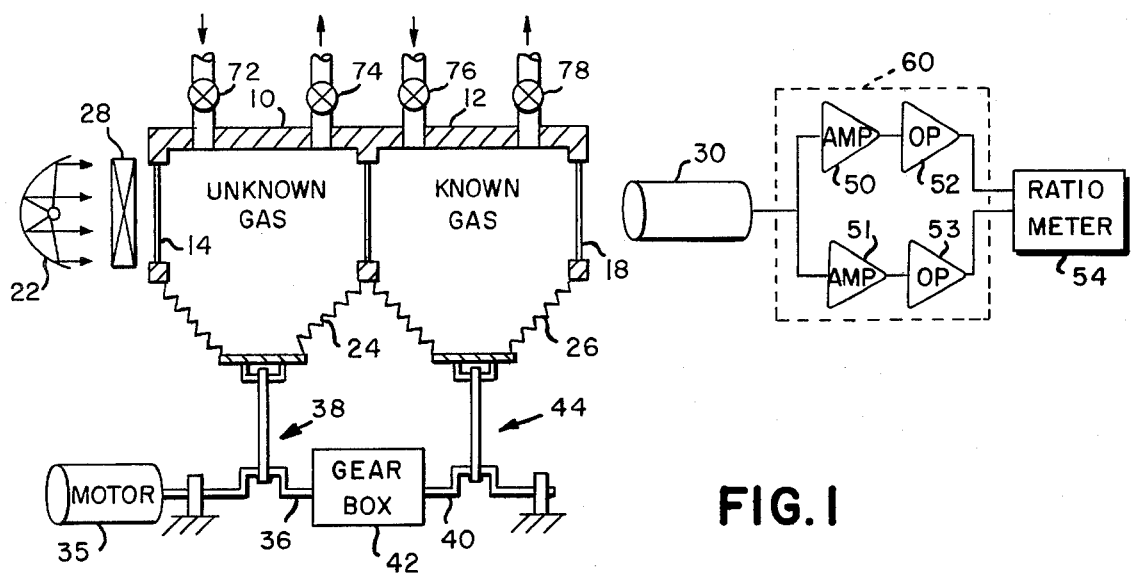
FIG. 1 is a schematic diagram of a simplified embodiment of the present invention.

Analytically, the intensity of the radiation detected by the radiation detector will be reduced from $I_0$, the intensity of the radiation from a radiation source, by absorption in the reference and unknown gas samples in accordance with the equation $$I_d - \Delta I_{d_\lambda} = I_0 + I_{0_\lambda} e^{-\mu [l_x \rho_x + \Delta (l_x \rho_x)] - \mu [l_\kappa \rho_\kappa + \Delta (l_\kappa \rho_\kappa)]} = I_0 + I_{0_\lambda} e^{-\mu [l_x \rho_x + l_\kappa \rho_\kappa]} e^{-\mu (\Delta l_x \rho_x)} e^{-\mu (\Delta l_\kappa \rho_\kappa)} \quad (1)$$

where $I$, $\mu$, $l$ and $\rho$ refer in general to light intensity, mass absorption coefficient, path length and density respectively; where $\Delta$ refers to a fluctuation component; where subscript letters $d$, $x$ and $k$ refer to the radiation detector, unknown gas sample and reference gas sample, respectively; and where the subscript $\lambda$'s call particular attention to the spectral structure.

$$I_d - \Delta I_{d_\lambda} = I_0 + I_{0_\lambda} \left[ 1 - \mu \Delta(l_x \rho_x) + \frac{\mu^2 \Delta^2(l_x \rho_x)}{2!} - \ldots \right] \times \left[ 1 - \mu \Delta(l_k \rho_k) + \frac{\mu^2 \Delta^2(l_k \rho_k)}{2!} - \ldots \right] \quad (2)$$

If the variability in the unknown gas sample is sinusoidal at $\omega$ and one considers the contribution of the first six terms of the power series to the term containing $\sin \omega$ (not harmonics of $\sin \omega$)

$$\Delta I_{x_\omega} = -I_0 \mu \Delta(l_x \rho_x) \left[ 1 - 0 + \frac{3}{8} \mu^2 \overline{\Delta^2(l_x \rho_x)} - 0 + \frac{5}{32} \mu^4 \overline{\Delta^4(l_x \rho_x)} - 0 \right] \quad (3)$$

where the bars indicate the peak amplitude of the fluctuation. In a typical instrument, the path length of the radiation through the unknown gas sample is chosen so that the absorption by the unknown gas reduces the intensity of the spectral lines of interest by approximately a factor of two at the maximum expected density. Modulation $\Delta (l_x \rho_x)$, in turn would be approximately 10% of $l_x \rho_x$, or approximately 5% of the initial energy in the band of interest. Upon substitution of these approximate design values in the equation, one obtains the following equation:

$$\Delta I_{\omega_0} = -\mu \Delta(l_x \rho_x) \left[ 1 + \frac{3}{3200} + \frac{5}{5.12 \times 10^6} \right] I_0 \quad (4)$$

which can be approximated with more than adequate precision by the equation $$\Delta I_{\omega_0} = -\mu \Delta (l_x \rho_x) I_0 \quad (5)$$

Similarly, if $\Delta (l_k \rho_k)$ is modulated sinusoidally at $\beta$, one may write $$\Delta I_{\beta_0} = -\mu \Delta (l_k \rho_k) I_0 \quad (6)$$

If the frequencies $\omega$ and $\beta$ are not harmonically related and if the output of the radiation detector is amplified by a means which amplifies only dynamic components at $\omega$, and is simultaneously amplified by a means which amplifies only those components fluctuating at $\beta$, it is clear from the earlier equation describing the composite signal that those two electrical signals, $\Delta E_\omega$ and $\Delta E_\beta$ will be proportional to the fluctuating intensities $\Delta I_\omega$ and $\Delta I_\beta$ as given above. One can then write $$\frac{\Delta E_\omega}{\Delta E_\beta} = \frac{-\mu \Delta(l_x \rho_x) I_0}{-\mu \Delta(l_k \rho_k) I_0} = \frac{\Delta (l_x \rho_x)}{\Delta (l_k \rho_k)}$$

Assuming that the density (as contrasted to the path length) is being varied sinusoidally, then the fractional change in density, $$K_\omega = \frac{\Delta \rho_x}{\rho_x}.$$

may be transposed and one may substitute $\Delta \rho_x = K_x \rho_x$, and $\Delta \rho_k = K_k \rho_k$ in the above equation to obtain $$\frac{\Delta E_\omega}{\Delta E_\beta} = \frac{l_x K_x \rho_x}{l_k K_k \rho_k} \quad (8)$$

or, transposing, $$\rho_x = \left( \frac{\Delta E_\omega}{\Delta E_\beta} \right) \left( \frac{l_k K_k}{l_x K_x} \right) \rho_k \quad (9)$$

With $\rho_k$ and all the factors within the second parenthesis controllable and adjustable to accommodate the range of gases and densities to be measured, the density of the desired gas in the unknown sample may then be obtained by multiplying the product of these preset values and the measured ratio of $\Delta E_\omega$ to $\Delta E_\beta$.

DETAILED DESCRIPTION OF THE PREFERRED EMBODIMENTS

Referring now to FIG. 1 of the drawings, there is shown in a simplified form, a preferred embodiment of the present invention which includes a pair of containers 10 and 12 having a plurality of walls 14, 16 and 18 forming windows which are transparent to radiation emanating from a radiant energy source 22 positioned to the left of the wall 14. Each of the containers 10 and 12 also includes flexible walls 24 and 26, respectively, which are in the form of bellows so as to enable the volume of the containers, and thus the density of gases contained therein, to be selectively modified. While this method of modulation can be improved by introducing acoustically resonant volumes or pipes to amplify the effect of motion of those walls and to allow increased operating frequency, the moving bellows will be used to explain the principle of the invention — the alternative embodiments being obvious after the basic invention is understood. Positioned to the right of container 12 is a radiant energy sensing means, such as a photodetector 30, for receiving radiation from source 22 after it has passed through containers 10 and 12. A filter 28, which blocks radiation of undesired wave lengths, for example, light outside of the infrared band, is positioned between the container 10 and the source 22, and/or at other appropriate locations in the apparatus. The filter 28 may be, for example, a dispersive filter, a gelatinous filter, an interference filter or a negative gas filter, depending on the needs of the particular measurement problem.

In order to selectively vary the volume of containers 10 and 12 and thus modulate the density of the gases contained therein, a suitable drive apparatus such as that shown schematically at 32 may be employed. Drive apparatus 32 includes a motor 34, a crank shaft 36 and a first crank assembly 38 for coupling bellows 24 to crank shaft 36. Shaft 36 also drives a second crank shaft 40 at a different frequency through suitable gears 42. Crank shaft 40 is coupled to bellows 26 through a second crank assembly 44. The gears 42 are arranged in any suitable manner for operating the bellows 24 and 26 at different frequencies which are not harmonically related.

Coupled to the output of photodetector 30 is a signal processor 60 comprising a pair of parallel coupled amplifiers 50 and 51, to each of which in series is coupled an operational amplifier 52 and 53, respectively. Amplifiers 50 and 51 are provided to amplify selected components of the photodetector output related to the frequency of modulation of the density of the gases in each of the containers 10 and 12, respectively, while the gain of each of the amplifiers 52 and 53 is adjusted to alter the output of each of the amplifiers 50 and 51 by a constant factor which corresponds to a predetermined value related to fixed and known characteristics of the apparatus and gas samples. The outputs of amplifiers 52 and 53 are in turn coupled to a ratio meter 54, such as a Hewlett-Packard Model 3450A MultiFunction meter. Alternatively, the outputs of amplifiers 52 and 53 could be rectified and a signal corresponding to their ratio generated and displayed with a dc ratio meter, such as a Hewlett-Packard DC Volt/Ratiometer Model 3420A/B.

In operation, a quantity of unknown gas suspected of containing, as a constituent thereof, a particular gas (such as carbon monoxide) is introduced into and exhausted from container 10 through, respectively, a pair of restrictive openings 72 and 74, and a quantity of the particular reference gas sought for in the unknown gas is introduced into and exhausted from container 12 through, respectively, a pair of restrictive openings 76 and 78. Radiation from source 22 is then directed through filter 28, windows 14, 16 and 18, and then onto photodetector 30. However, certain bands of the incident radiation are absorbed by the gases in containers 10 and 12 so that the intensity of the radiation reaching photodetector 30 is a function of the absorption characteristics of the two gases. Restrictive openings 72, 74, 76 and 78 may be valves operated in such a fashion as to introduce and hold a gas sample during a measurement, or alternatively may be tubes or ports of small diameter designed to minimize gas flow during the cyclic volume change of the container while allowing the slow transpiration of a sampled gas.

As the radiation is passed through the containers, the density of the unknown gas in container 10 is varied at a first frequency $\omega$ as motor 34 drives bellows 24, and the density of the reference gas in container 12 is varied at a second frequency $\beta$ as bellows 26 are similarly driven. The difference in the frequencies $\omega$ and $\beta$ is, of course, obtained through the use of the gears 42. Although a separate motor could be used to drive each of the crank assemblies 38 and 44, the depicted single motor drive version is preferred inasmuch as it eliminates any differential drift that might exist between two drive motors.

Since the densities of the reference and unknown gases are varied at the frequencies $\omega$ and $\beta$ respectively, and the absorption process is exponential and therefore inherently nonlinear, there will, as pointed out above, be signal mixing in the radiation seen by photocell 30. Accordingly, the electrical signals generated by photodetector 30 will have frequencies $\omega$, $\beta$, $\omega+\beta$, $\omega-\beta$, etc.

To obtain a signal from photocell 30 which is proportional to the fluctuating intensities, $\Delta I_\omega$ and $\Delta I_\beta$, of the radiation passing through containers 10 and 12, respectively, the amplifiers 50 and 51 are adjusted, respectively, to amplify only those components of the photocell output fluctuating at the frequency of modulation $\omega$ and $\beta$. Thus the output of amplifier 50 will provide a signal $\Delta E_\omega$ and the output of amplifier 51 will provide a signal $\Delta E_\beta$.

Referring to the above described Theory of Operation, it will be recalled that the ratio of the output of the amplifiers 50 and 51 is proportional to the density of the reference gas in container 12 by factors related to the path length of the radiation in the containers and the fractional change in density of the samples, all of which are controllable and adjustable. Accordingly, the gain of each of amplifiers 52 and 53 is adjusted to provide an output corresponding to these known and fixed characteristics. Thus modified, the ratio of the output of amplifiers 50 and 51 is then formed and the signal corresponding thereto displayed in the ratio meter 54 for providing a direct readout of the density of the reference gas in the unknown sample in container 10.

Figure 2:
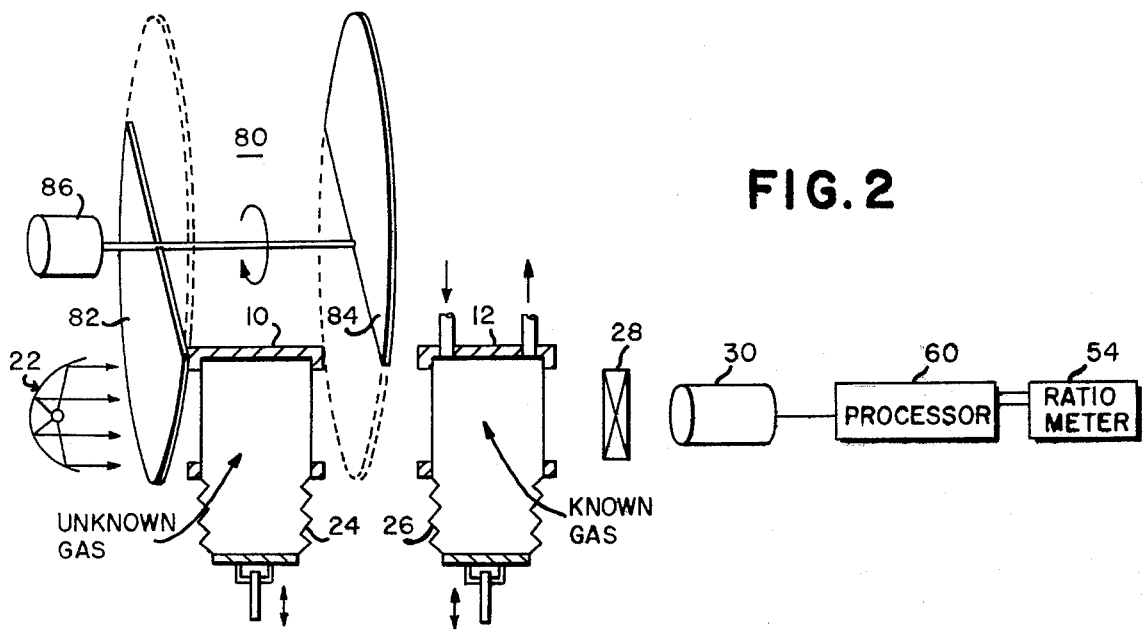
FIG. 2 is a partial schematic diagram of an alternative embodiment of the present invention.

Referring now to FIG. 2 of the drawings, an alternate embodiment of the present invention is illustrated in part. The mechanical drive and electronic components are not repeated since any suitable components functionally equivalent to those shown in FIG. 1 may be used. This embodiment is generally similar to the embodiment illustrated in FIG. 1 except that a light chopping means 80 is provided that includes chopper blades 82 and 84 which are rotated by a motor 86 at a low frequency compared to the gas modulation frequencies. During a portion of its revolution chopper blade 82 blocks and thereby prevents radiation from source 22 from entering container 10. However, during the remainder of its revolution, radiation from source 22 is permitted to enter container 10 to excite the reference gas and cause it to fluoresce. The radiation itself may be intense enough to give rise to fluorescence or it may cooperate with the pressure-temperature changes effected by bellows 24 to cause fluorescence.

Chopper blade 84 is complementary to chopper blade 82 and serves to prevent radiation from source 22 from passing directly through container 10 and into container 12. Consequently, the radiation which passes into the unknown gas in container 12 is that fluorescent radiation generated by the sample of that gas in container 10 as it is caused to fluoresce. By appropriate design of the cavity shape, interior finish, and/or by use of suitable optical elements, the fluorescent radiation induced in the gas in container 10 is directed through the reference sample in container 12, and then into detector 30. In this embodiment, it may be desirable to use a more pronounced cyclic variation in the pressure-temperature of the gas than in the FIG. 1 embodiment to induce the desired level of fluorescence. Since a number of undesirable signals develop in the apparatus whose intensities are proportional to the intensity of the incident light (e.g., scattering from dust particles, etc., contained in the gas under test and density modulated along with the gas under test), the substitution of a fluorescent source from the source 22 (that source being the gas under test) eliminates all radiation except that radiation which is strongly absorbed by the gas of interest and therefore minimizes the intensity of the undesirable signals compared to the signal of interest.

In passing through container 12, the intensity of the radiation emitted from container 10 is reduced by the presence of even a very small quantity of the reference gas in the unknown sample and the amount of that reduction (by absorption) is thereafter detected as in the previous embodiment and used to provide a direct measure of the amount of reference gas contained in the unknown sample.

Figure 3:
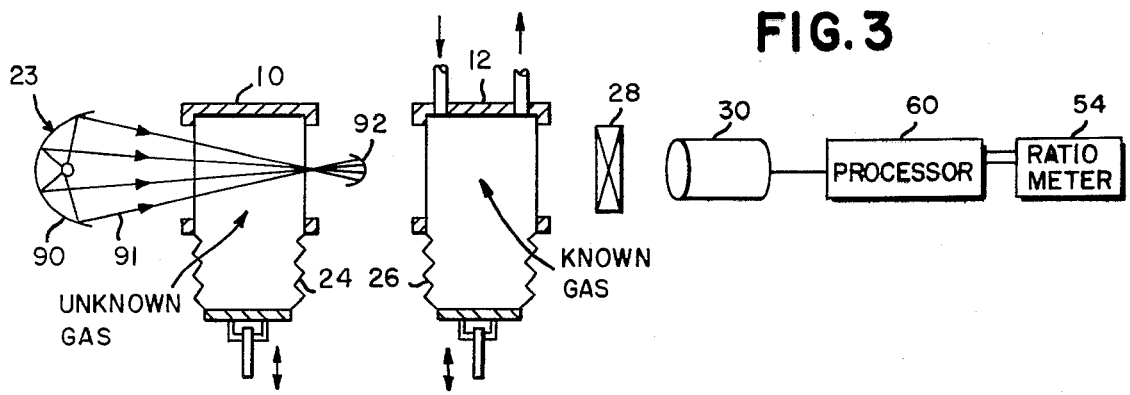
FIG. 3 is a partial schematic diagram of another alternative embodiment of the present invention.

In FIG. 3 of the drawings, still another embodiment of the present invention is shown in part and, as in the previous embodiments, includes a first variable volume container 10 and a second variable volume container 12, along with a source of radiation 23, an interference filter 28, a photodetector 30 and mechanical drive and electronic components (not shown) as illustrated in FIG. 1. In this embodiment, however, the mirror 90 of source 23 is designed so as to cause the rays 91 to converge toward a light trap 92 as they pass through container 10. Light trap 92 is positioned between containers 10 and 12, and collects substantially all of the direct radiation from source 23 thereby preventing it from passing through the known gas in container 12. In passing through container 10, the radiation, either independently or in cooperation with the cyclic pressure-temperature changes effected by bellows 24, causes the unknown gas to fluoresce and only this fluorescent re-radiation is allowed to pass through the reference gas in container 12 to fall upon photodetector 30. As in the previous embodiments, a particular one of the output signal components generated by photodetector 30 in response to receiving the incident radiation is electronically separated by amplifiers 50 and 51 and used to indicate the presence and quantity of a particular gaseous constituent within the unknown gas.

Figure 4:
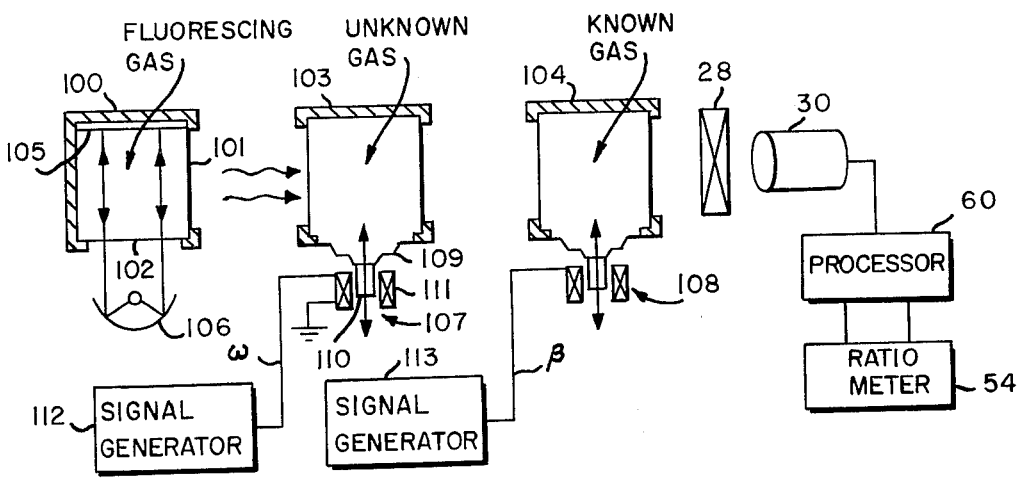
FIG. 4 is a partial schematic diagram of another alternative embodiment of the present invention.
Figure 5:
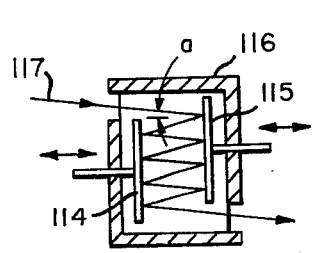
FIG. 5 is a partial schematic diagram of still another alternative embodiment of the present invention.

Still another modification of the present invention is illustrated in FIG. 4 and includes a third gas container 100 having windows 101 and 102 in two adjacent walls instead of in opposite walls as in containers 103 and 104. Disposed within container 100 and on the wall opposite window 102 is a reflector 105 positioned so as to reflect light from source 106 back out of the gas containing chamber through window 102. Container 100 is filled with a fluorescing quantity of the known gas (or of some alternative gas having very narrow radiation lines of interest) which when irradiated by source 106 fluoresces to provide a source of well defined radiant energy for passage through the unknown gas in container 103 and the known gas in container 104.

Another modification shown in this embodiment is the use of the electrodynamically driven volume compression devices 107 and 108 forming the lower walls of containers 103 and 104, respectively. As illustrated, devices 107 and 108 may be comprised of a "loud speaker" type structure including a diaphragm 109 driven by the armature 110 of the solenoid 111. Oscillatory energy of a frequency $\omega$ is supplied to device 107 by a signal 112 and oscillatory energy of frequency $\beta$ is supplied to device 108 by a signal generator 113. The densities of the gases contained within containers 103 and 104 are thus modulated at frequencies $\omega$ and $\beta$, respectively, as in the previously described mechanically driven embodiments. It will, of course, be appreciated that any other suitable volume compression device may also be used to periodically increase the density of the gases in containers 103 and 104.

As an alternative to density modulation of the sample and unknown gases, it will be recognized that similar ends can be achieved by varying the path length of the light passing through the respective gases. Such path length variation can be accomplished by positioning displaceable parallel mirrors 114 and 115 in a gas container 116 and directing the incident light rays into container 116 in a direction such that they have an angle of incidence $\alpha$ with mirror 115. Then by causing at least one of the mirrors 114 and 115 to be oscillatorily displaced relative to the other, the length of the path taken by light rays 117 in passing through container 116 will be varied at the oscillatory frequency.

The length L of the path taken by the light rays 117 is $$L = nd/\cos\alpha \qquad (10)$$

where $n$, the number of reflections expressed in terms of $l$, the length of mirrors 114 and 115, and $d$, the separation between mirrors 114 and 115, is $$n = l/(d\tan\alpha) \qquad (11)$$

For small angles $$n \approx l/(\alpha d) \qquad (12)$$

and $$L \approx l/\alpha$$

Accordingly, by reasoning similar to that above, the intensity $I_1$ of the light (of initial intensity $I_0$) transmitted through chamber 114 may be expressed as $$I_1 = I_0(1-R)^{\frac{l}{\alpha d}} \left( e^{-\frac{\mu\rho l}{\alpha}} \right) \qquad (13)$$

From this relationship it can thus be noted that the term containing the reflectivity R will have an effect approximately equal to that of reflection at densities of about $10^{-4}$ atmospheres and will be dominant when $\rho \approx 10^{-2}$ atmospheres.

Figure 6:
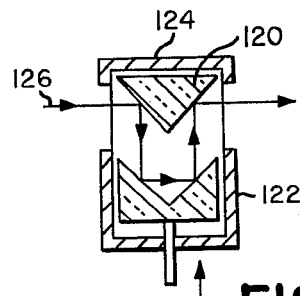
FIGS. 6–7 illustrate other alternative methods of varying the number of molecules seen by light rays passing through a quantity of gas.

The alternative embodiment illustrated in FIG. 6 can be used, however, to introduce a light path length variation without causing any change in the angle of reflection. In this embodiment a pair of 45° mirror devices 120 and 122, at least one of which is displaceable, are mounted within the container 124. By moving mirror 122 up and down in oscillatory fashion, as illustrated, it will be seen that the distance traveled by light rays 126 in passing through container 124 will be changed as in the previous embodiment.

Figure 7:
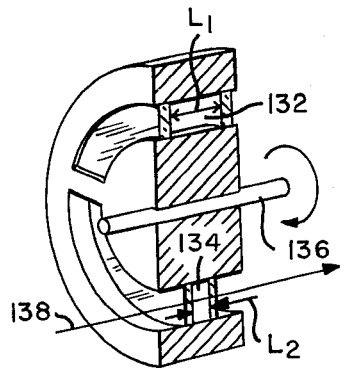

Still another alternative embodiment of the invention, shown in FIG. 7, includes a rotating gas container 130 having a first arcuate shaped gas chamber 132 with an axial light path length $L_1$, and a second arcuate shaped gas chamber 134 with a smaller light path length $L_2$. As container 130 is rotated about its axis 136, the light rays 138 will be modulated at the rotational frequency of container 130 and will have a modulation amplitude proportional to $L_1/L_2$ where the densities of the gases in chambers 132 and 134 are equal. It will be appreciated that the modulation amplitude can be increased or decreased by increasing or decreasing the density of the gas in an appropriate one of the chambers. As in the previous embodiments a second container filled with the unknown gas and positioned adjacent container 130 will also be utilized so that the reference modulated light rays 138 are modulated a second time in passing through the unknown gas container to produce the signal mixing discussed above.

In accordance with further alternative embodiments of the invention, several reference gas samples can be simultaneously introduced into a number of separate sample containers serially situated with respect to the container 10 with each sample being modulated at a different frequency to allow simultaneous identification of several components in the unknown gas. Alternatively, the reference gas can be periodically exchanged for a new reference gas to allow sequential detection of a number of components in the unknown gas. Furthermore, photodetector 30 can be preceded by a filter 28 as is shown in FIGS. 2–4, which reduces the spectral width of the energy incident on the photodetector to those general regions of the spectrum where absorption is effected by the gas being analyzed.

Replacement of photocell 30 with a mirror will allow one to place the light generator and detector in the same portion of the apparatus and remote from the chamber 12. Furthermore, measurement of the unabsorbed light reflected from the mirror will allow correction of the signal for variations in mirror reflectivity.

Use of a natural light source (such as the sun) to illuminate a scene in configuration with a density modulation of the reference gas, a changing ray path, and a correction for the natural variation of light intensity (by using the unabsorbed wavelengths as a reference beam for the absorbed wavelengths), will allow the use of the present technique as a method of remotely detecting gases. Although other modifications of the present invention will undoubtedly become apparent to those skilled in the art after having read the above disclosure, it is understood that the appended claims are to be interpreted as covering all such embodiments and subsequent modifications which fall within the true spirit and scope of the invention.

What is claimed is:

1. A nondispersive gas analyzing apparatus comprising:
    a first means for containing a first gas sample including a reference gas;
    a second means for containing a second gas sample including an unknown amount of said reference gas;
    a means for passing radiant energy through said first and said second gas samples for permitting at least partial absorption of said energy by said gas samples;
    a means for modulating the amount of said energy absorbed by said gas samples at a first and a second frequency;
    a means responsive to the unabsorbed energy passing through said gas samples for generating a first signal at said first frequency and a second signal at said second frequency; and
    a means responsive to said first and said second signals for generating a third signal proportional to the density of said reference gas in said second gas sample.

2. A nondispersive gas analyzing apparatus according to claim 1 wherein said third signal generating means comprises a means for generating a ratio of said first and said second signals.

3. A nondispersive gas analyzing apparatus according to claim 1 wherein said modulating means comprises means for modulating the density of said first and said second gas samples at said first and said second frequencies, respectively.

4. A nondispersive gas analyzing apparatus according to claim 2 wherein said first and said second frequencies are not harmonically related.

5. A nondispersive gas analyzing apparatus according to claim 3 wherein said density modulating means comprises means for periodically varying the volume of said first and said second gas samples.

6. A nondispersive gas analyzing apparatus according to claim 1 wherein said means for modulating said energy absorbed by said first and said second gas samples comprises means for modulating the length of the path of said radiant energy through said samples.

7. A nondispersive gas analyzing apparatus as recited in claim 6 wherein said means for modulating the path length of said radiant energy in passing through said gas samples includes a first reflective surface disposed at an angle relative to the incident radiant energy, and a second reflective surface disposed parallel to said first reflective surface, whereby said radiant energy is reflected from said first reflective surface to said second reflective surface, and means for periodically moving one of said reflective surfaces relative to the other.

8. A nondispersive gas analyzing apparatus as recited in claim 1 comprising chopper means disposed on each side of said first containing means and operative to periodically admit direct radiant energy from said radiant energy source means to enter said first containing means while preventing such direct radiant energy from entering said second containing means.

9. A nondispersive gas analyzing apparatus as recited in claim 1 wherein said radiant energy source means includes means forming a third containing means for containing a known gas, and means for causing said known gas to fluoresce and thereby provide said radiant energy.

10. A nondispersive gas analyzing apparatus as recited in claim 1 wherein said radiant energy source means includes means for causing said reference gas in said unknown gas sample to fluoresce, said fluorescence providing radiant energy for passage through said second containing means.

11. A gas analyzing method comprising the steps of:
    providing a quantity of a reference gas and quantity of an unknown gas;
    directing radiant energy serially through said reference gas and said unknown gas in such a manner that said radiant energy is at least partially absorbed in passing therethrough;
    modulating the absorption of said radiant energy in said reference gas at a first frequency;
    modulating the absorption of said radiant energy in said unknown gas at a second frequency;

detecting the modulated radiant energy and developing an electrical signal commensurate therewith, said electrical signal including signal components related to the constituents of said unknown gas;

separating from said electrical signal a pair of signal components comprising said first and said second frequencies; and forming a ratio of said pair of signal components for generating a signal proportional to the density of said reference gas in said unknown gas sample.

12. A gas analyzing method as recited in claim 11 wherein the modulation of the absorption of said radiant energy in said reference gas is effected by varying the density of said reference gas at said first frequency, and the modulation of said radiant energy in said unknown gas is effected by varying the density of said unknown gas at said second frequency.

13. A gas analyzing method as recited in claim 11 wherein the modulation of the absorption of said radiant energy in said reference gas is effected by periodically varying at said first frequency the length of the path taken by said radiant energy in passing through said reference gas, and the modulation of said radiant energy in said unknown gas is effected by periodically varying at said second frequency the length of the path taken by said radiant energy in passing through said unknown gas.

14. In a nondispersive gas analyzing apparatus including a pair of chambers for containing a reference gas sample and an unknown gas sample including an unknown quantity of said reference gas, a source of radiant energy, a means for passing said energy through said samples for absorption by said samples in accordance with their respective energy absorbing characteristics, a means for modulating said energy absorbing characteristics of each of said samples at a first and a second frequency, respectively, and a means responsive to the unabsorbed radiant energy after passage through said samples for generating an electrical signal containing said first and said second frequencies, the improvement comprising, a means responsive to said electrical signal for generating a first signal at said first frequency and a second signal at said second frequency; and a means responsive to said first and said second frequency signals for generating a third signal proportional to the density of said reference gas in said unknown gas sample.

15. A nondispersive gas analyzing apparatus according to claim 14 wherein said first and said second signal generating means comprises means for selectively amplifying said first and said second frequency signals and said third signal generating means comprises a means for forming a signal corresponding to the ratio of said first and said second frequency signals.

* * * * *